Figure 1:
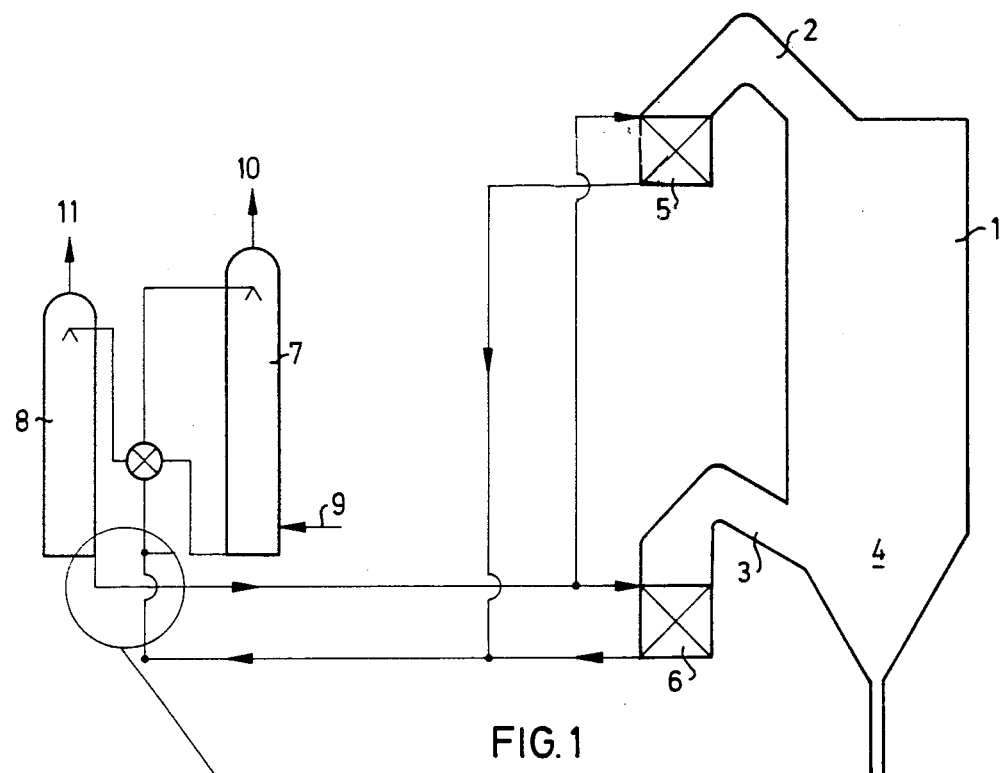

United States Patent [19]

Mathisson et al.

[11] 4,432,789
[45] Feb. 21, 1984

[54] METHOD OF MINIMIZING ENERGY CONSUMPTION WHEN REDUCING IRON OXIDE WITH REDUCING GASES

[75] Inventors: Göran Mathisson; Sven Santen, both of Hofors, Sweden

[73] Assignee: SKF Steel Engineering, Hofors, Sweden

[21] Appl. No.: 460,499

[22] Filed: Jan. 24, 1983

[30] Foreign Application Priority Data

Mar. 2, 1982 [SE] Sweden .............................. 8201273

[51] Int. Cl.³ .............................................. C21B 13/02
[52] U.S. Cl. .......................................... 75/35; 266/156
[58] Field of Search ............................. 75/35; 266/156

[56] References Cited

U.S. PATENT DOCUMENTS 2,977,216  3/1961  Whaley ................................ 266/155
3,909,244  9/1975  Rose et al. ............................. 75/35

Primary Examiner—M. J. Andrews
Attorney, Agent, or Firm—Brumbaugh, Graves, Donohue & Raymond

[57] ABSTRACT

Energy consumption may be minimized when reducing iron oxide with reducing gases which are at least partially re-circulated in the process and where the re-circulation gas is washed to remove the reaction product $CO_2$ in what is known as a $CO_2$ wash to enable it to be re-used, by the heat requirement necessary for regenerating the washing liquid in the $CO_2$ wash being entirely or partially covered by the physical heat content in top gas from the shaft furnace and/or gas leaving the sponge-iron cooler of the shaft furnace.

8 Claims, 2 Drawing Figures

METHOD OF MINIMIZING ENERGY CONSUMPTION WHEN REDUCING IRON OXIDE WITH REDUCING GASES

DESCRIPTION

The present invention relates to a method and means for minimizing the energy consumption when reducing iron oxide with reducing gases which are at least partially re-circulated in the process and where the re-circulation gas is washed to remove the reaction product $CO_2$ in what is known as a $CO_2$ wash to enable it to be re-used.

As is known, such a $CO_2$ wash uses a great deal of energy, normally in the form of steam to heat the washing solution to be regenerated. The quantity of energy required for this is a major part of the total energy uses to produce sponge-iron in shaft furnaces, which considerably increases the manufacturing costs for the sponge-iron process.

It has therefore been a requirement to minimize this energy consumption and this is achieved in accordance with the present invention primarily in that the heat requirement necessary for regenerating the washing liquid in the $CO_2$ wash is entirely or partially covered by the physical heat content in top gas from the reduction furnace and/or gas leaving the sponge-iron cooler.

By thus utilizing the physical heat content existing in the reduction gas leaving the furnace shaft, and possibly also in the cooling gas leaving the sponge-iron cooler, for heating the washing solution to be regenerated, the heat supplied externally in the form of steam can be entirely or partially replaced, which greatly reduces the process costs.

According to a preferred embodiment of the invention heat-exchangers are placed in the pipes leading the reducing gas from the furnace shaft and/or in the pipes leading the cooling gas from the sponge-iron cooler.

According to another embodiment of the invention, the washing solution to be regenerated may be caused to pass one of such heat-exchangers directly. Alternatively, water vapour can be produced in said heat-exchangers and thereafter be used for regeneration.

The invention also relates to a means or apparatus for performing the method described above, having heat-exchangers placed as indicated above.

Figure 2:
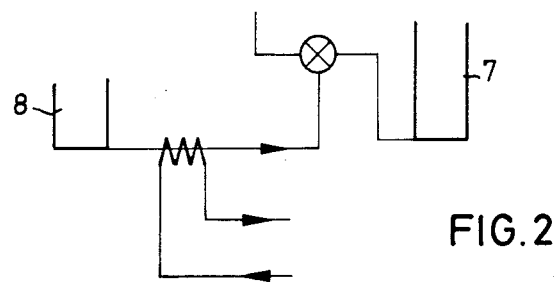

The invention will be described more fully in the following with reference to the accompanying drawings, in which FIG. 1 is a principal diagram of a means or apparatus according to the invention, and FIG. 2 shows an alternative embodiment of the equipment shown in FIG. 1.

In the equipment shown in FIGS. 1 and 2 a conventional shaft furnace is designated 1. The shaft 1 has an outlet 2 for hot reduction gas at the top and an outlet 3 at the bottom for hot cooling gas from a sponge-iron cooler. Heat-exchangers 5, 6 have been arranged in the outlets 2 and 3. The reduction gas leaving the shaft 1 is cooled and thereafter caused to pass a washing solution in a $CO_2$ wash 7, the gas being introduced at point 9 in the bottom of the wash 7 and removed from the top 10. The washing liquid from the wash 7 is passed to a stripper 8 for regeneration, where it is continuously regenerated by means of heating. This heating may be achieved according to the invention by means of steam obtained by water being pumped through one or both the heat-exchangers 5, 6 mentioned above. Alternatively, the washing solution itself can be pumped directly through said heat-exchangers for regeneration.

The energy conservation aimed at according to the invention is thus achieved in the illustrated embodiments by an arrangement of heat-exchangers or tube-coolers in the outlet pipe for hot reduction gas from the furnace shaft and/or in the outlet pipe for hot cooling gas from the sponge-iron cooler.

We claim:

1. A method of reducing iron oxide so as to produce sponge iron in a shaft furnace having upper and lower portions, said method comprising the steps of supplying a hot reducing gas to the lower portion of the shaft furnace, passing the reducing gas upwardly through the iron oxide contained in the shaft furnace, withdrawing the reducing gas from the upper portion of the shaft furnace, passing the reducing gas from the upper portion of the shaft furnace through a $CO_2$ wash so as to remove substantially all $CO_2$ from said gas, and thereafter recirculating at least a portion of said gas into the lower portion of said furnace, said method further comprising using a wash liquid in said $CO_2$ wash to remove said $CO_2$ from said reducing gas, regenerating said wash liquid for reuse in said $CO_2$ wash by supplying heat to said wash liquid, and obtaining said heat from the physical heat contained in the reducing gas which is removed from the upper portion of the shaft furnace.

2. Method according to claim 1, which comprises supplying the heat required for regenerating the washing liquid by means of heat-exchangers placed in pipes leading the reduction gas from the shaft furnace.

3. Method according to claim 2 which comprises the step of causing the washing liquid to be regenerated to pass said heat-exchangers directly.

4. Method according to claim 2 which comprises the steps of causing water for steam generation to pass said heat-exchangers and utilizing water vapour thus generated to regenerate the washing liquid.

5. A method of reducing iron oxide so as to produce sponge iron in a shaft furnace having upper and lower portions, said method comprising the steps of supplying a hot reducing gas to the lower portion of the shaft furnace, passing the reducing gas upwardly through the iron oxide contained in the shaft furnace, withdrawing the reducing gas from the upper portion of the shaft furnace, passing the reducing gas from the uper portion of the shaft furnace through a $CO_2$ wash so as to remove substantially all $CO_2$ from said gas, and thereafter recirculating at least a portion of said gas into the lower portion of said shaft furnace, and thereby reducing said iron oxide to sponge iron, said method further comprising cooling said sponge iron with a cooling gas in a sponge iron cooler, using a wash liquid in said $CO_2$ wash to remove said $CO_2$ from said reducing gas, regenerating said wash liquid for reuse in said $CO_2$ wash by supplying heat to said wash liquid, and obtaining said heat from the physical heat contained in the cooling gas after it has been used to cool the sponge iron.

6. Method according to claim 5, which comprises supplying the heat required for regenerating the washing liquid by means of heat-exchangers placed in pipes leading the cooling gas from the sponge-iron cooler.

7. Method according to claim 6 which comprises the step of causing the washing liquid to be regenerated to pass said heat-exchangers directly.

8. Method according to claim 6 which comprises the steps of causing water for steam generation to pass said heat-exchangers and utilizing water vapour thus generated to regenerate the washing liquid.

* * * * *